(12) United States Patent
Yoo et al.

(10) Patent No.: US 11,425,366 B2
(45) Date of Patent: Aug. 23, 2022

(54) TEST IMAGE MEASURING DEVICE, DISPLAY DEVICE AND LUMINANCE CORRECTING METHOD

(71) Applicant: Samsung Display Co., LTD., Yongin-si (KR)

(72) Inventors: Hyun Seuk Yoo, Seoul (KR); Dong Joon Kwag, Seongnam-si (KR); Hyung Jin Kim, Seoul (KR); Seong Heon Cho, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/815,986

(22) Filed: Mar. 11, 2020

(65) Prior Publication Data

US 2021/0029347 A1 Jan. 28, 2021

(30) Foreign Application Priority Data

Jul. 22, 2019 (KR) .................. 10-2019-0088332

(51) Int. Cl.
*H04N 17/04* (2006.01)
*G09G 3/00* (2006.01)
*G09G 3/3225* (2016.01)

(52) U.S. Cl.
CPC ............ *H04N 17/04* (2013.01); *G09G 3/006* (2013.01); *G09G 3/3225* (2013.01); *G09G 2320/0233* (2013.01); *G09G 2320/0257* (2013.01)

(58) Field of Classification Search
CPC ...... H04N 17/04; G09G 3/006; G09G 3/3225; G09G 2320/0233; G09G 2320/0257; G09G 2320/0285; G09G 2320/0693; G09G 2354/00; G09G 2360/147; G09G 2360/16; H01L 51/0031
See application file for complete search history.

(56) References Cited

U.S. PATENT DOCUMENTS

| | | | |
|---|---|---|---|
| 2013/0329057 A1* | 12/2013 | Al-Dahle | G09G 3/3655 |
| | | | 348/189 |
| 2015/0116387 A1 | 4/2015 | Jun et al. | |
| 2015/0146017 A1* | 5/2015 | Kim | H04N 17/04 |
| | | | 348/189 |
| 2018/0089822 A1* | 3/2018 | Nirmal | G06T 7/0004 |
| 2020/0137370 A1* | 4/2020 | Tanaka | H04N 5/57 |

FOREIGN PATENT DOCUMENTS

| | | |
|---|---|---|
| JP | 4892222 | 3/2012 |
| KR | 1020150048394 | 5/2015 |
| KR | 1020170088452 | 2/2017 |
| KR | 1020180039224 | 4/2018 |
| KR | 101955904 | 3/2019 |

\* cited by examiner

*Primary Examiner* — Michael E Teitelbaum
(74) *Attorney, Agent, or Firm* — Cantor Colburn LLP (57) ABSTRACT

A display device relates to a test image measuring device, and includes a housing including one side in which an opening is defined, and a reflector provided to be inclined by a predetermined angle from another side of the housing facing the opening, where a display device including a display unit and an imaging unit is provided above the opening, and a test image displayed from the display unit is photographed by the imaging unit through the reflector.

9 Claims, 10 Drawing Sheets

TEST IMAGE MEASURING DEVICE, DISPLAY DEVICE AND LUMINANCE CORRECTING METHOD

This application claims priority to Korean Patent Application No. 10-2019-0088332 filed on Jul. 22, 2019, and all the benefits accruing therefrom under 35 U.S.C. § 119, the content of which in its entirety is herein incorporated by reference.

BACKGROUND

(a) Field

Embodiments of the invention relate to a test image measuring device, a display device, and a luminance correcting method.

(b) Description of the Related Art

Recently, an organic light emitting device from among display devices has attracted attention as a next-generation display device due to various merits such as high-speed response rates, low power consumption, high resolution, and a wide screen.

The organic light emitting device includes a driving thin film transistor ("TFT"), a switching TFT, a capacitor, and an organic light emitting element, and one pixel controls a size of a data current flowing to a light-emitting device from a driving power source to allow the organic light emitting element to emit light by switching the driving TFT according to a data voltage, thereby displaying a predetermined image.

SUMMARY

When an identical data voltage is supplied to each of the pixels, an image-quality distortion phenomenon such as image sticking or mura is generated by a threshold voltage deviation of the driving thin film transistor ("TFT") included in each pixel and a luminance deviation caused by a change of channel mobility and/or degradation of the organic light emitting element. The above-described image-quality distortion phenomenon is generated by other display devices as well as the organic light emitting device.

Embodiments of the invention have been made in an effort to solve drawbacks such as image sticking or mura generated by a threshold voltage deviation of the driving TFT, a change of channel mobility, and/or degradation of an organic light emitting element when a display device is used after a product is shipped.

An embodiment of the invention provides a display device including a housing including one side in which an opening is defined, and a reflector inclined by a predetermined angle from another side of the housing facing the opening, where a display device including a display unit and an imaging unit is provided above the opening, and a test image displayed from the display unit is photographed by the imaging unit through the reflector.

In an embodiment, the housing may be in a darkroom state.

In an embodiment, a length and a width of the opening may be less than a length and a width of the display device.

In an embodiment, the predetermined angle may represent an angle defined within a range in which the test image displayed by the display unit is reflected to the reflector, and an entirety of a display area of the display unit is photographed by the imaging unit.

In an embodiment, the test image measuring device may further include a cover which covers the housing.

In an embodiment, the display unit and the imaging unit may be provided on a same side.

In an embodiment, the display device may further include an organic light emitting element.

Another embodiment of the invention provides a luminance correcting method including receiving a start signal, positioning a display device including a display unit and an imaging unit on a test image measuring device, displaying a test image at the display unit to display, and photographing a reflected test image at the imaging unit, receiving data of the reflected test image from the imaging unit, and calculating luminance correcting variables of each pixel, and displaying a luminance-corrected image at the display unit by reflecting the calculated luminance correcting variables.

In an embodiment, the displaying the test image at the display unit may include starting the test image when the start signal is received and a predetermined time passes.

In an embodiment, the predetermined time may represent a time for positioning the display device on the test image measuring device.

In an embodiment, the luminance correcting method may further include, after the photographing the reflected test image at the imaging unit, notifying that the displaying the test image is finished.

In an embodiment, the luminance correcting method may further include, after the luminance correcting variable is calculated, displaying a sample image checking notification window to which the luminance correcting variable is reflected.

In an embodiment, the luminance correcting method may further include, after the displaying the sample image checking notification window, displaying a luminance-corrected sample image when a sample image checking signal is input.

In an embodiment, the luminance correcting method may further include, after the displaying the sample image, displaying a luminance correcting variable reflection checking notification window.

In an embodiment, after the luminance correcting variable reflection checking notification window is displayed, the display unit may display the luminance-corrected image when the luminance correcting variable reflecting signal is input.

In an embodiment, the test image measuring device may include a housing including one side in which an opening is defined, and a reflector provided to be inclined by a predetermined angle from another side of the housing facing the opening, and the display device may be provided above the opening, while a test image displayed from the display unit may be photographed by the imaging unit through the reflector.

Yet another embodiment of the invention provides a display device including a display unit including a plurality of pixels and displaying a test image, a test image provider which provides the test image to the display unit, and an imaging unit which photographs a reflected test image generated by reflecting the test image.

In an embodiment, the display unit and the imaging unit may be provided on a same side.

In an embodiment, the display device may further include a controller which controls the display unit, the test image provider, and the imaging unit.

In an embodiment, the controller may calculate a luminance correcting variable from test reflecting image data provided from the imaging unit, and may generate correction data of each of the plurality of pixels from a calculated luminance variable.

According to the embodiments, the drawbacks such as image sticking or mura generated by the threshold voltage deviation of the driving TFT, the change of channel mobility, and/or the degradation of an organic light emitting element may be solved by the test image display device for correcting luminance.

Further, the lifespan of the display device may be increased as the image-quality distortion phenomenon of the display device is solved.

BRIEF DESCRIPTION OF THE DRAWINGS

The above and other embodiments, advantages and features of this disclosure will become more apparent by describing in further detail embodiments thereof with reference to the accompanying drawings, in which.

DETAILED DESCRIPTION

The invention will be described more fully hereinafter with reference to the accompanying drawings, in which embodiments of the invention are shown. As those skilled in the art would realize, the described embodiments may be modified in various different ways, all without departing from the spirit or scope of the invention.

To clearly describe the invention, portions which do not relate to the description are omitted, and like reference numerals designate like elements throughout the specification.

The size and thickness of each component shown in the drawings are arbitrarily shown for better understanding and ease of description, but the invention is not limited thereto. In the drawings, the thickness of layers, films, panels, regions, etc., are exaggerated for clarity. For better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

Unless explicitly described to the contrary, the word "comprise" and variations such as "comprises" or "comprising" will be understood to imply the inclusion of stated elements but not the exclusion of any other elements.

The phrase "in a plan view" means viewing the object portion from the top, and the phrase "in a cross-section" means viewing a cross-section of which the object portion is vertically cut from the side.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a display device for correcting luminance in an embodiment will be described.

Figure 1:
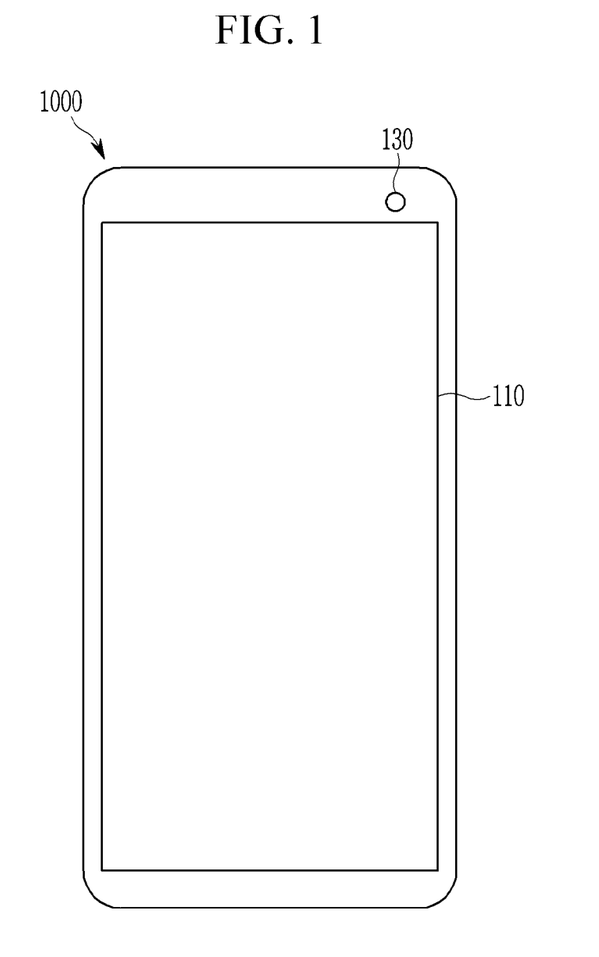
FIG. 1 shows an embodiment of a display device.

FIG. 1 shows an embodiment of a display device.

Referring to FIG. 1, the display device 1000 includes a display unit 110 including a plurality of pixels for displaying images, and an imaging unit 130 for photographing a subject from an outside.

The display device 1000 may be realized to be a mobile phone such as a smartphone, but is not limited thereto, and may be applied to various types of devices such as a tablet personal computer ("PC"), a smartwatch, a portable media player ("PMP"), a personal digital assistant ("PDA"), a laptop PC, a television ("TV"), or a head mounted display ("HMD") that may be installed by a user and have a display function.

The display unit 110 displays images, and may be realized to be an organic light-emitting diode ("OLED") in an embodiment, and may be realized to be various types of displays such as a liquid crystal display ("LCD") or a quantum dot ("QD") display panel depending on embodiments.

In an embodiment, the display unit 110 may be realized to be a touch screen type forming a layered structure with a touch pad, and in this case, the display unit 110 may be used as a user interface in addition to an output device.

The imaging unit 130 may be realized to be a camera, and the camera is provided on a front side of the display device 1000. Here, the front side represents a side that is provided on a same side as the display unit 110. In FIG. 1, the imaging unit 130 is illustrated to be separated from the display unit 110, and may be provided inside the display unit 110 depending on embodiments.

A test image measuring device for acquiring data for correcting luminance by the above-described display device will now be described.

Figure 2:
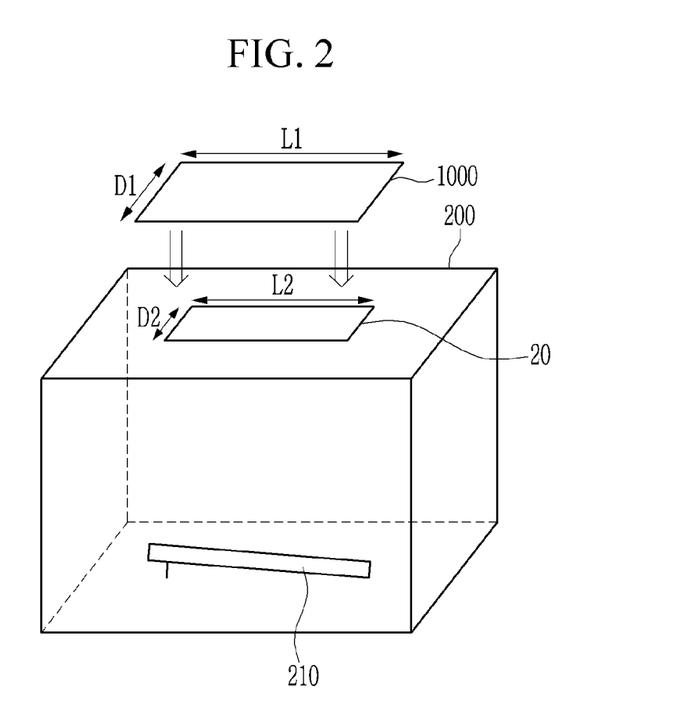
FIG. 2 shows a perspective view of an embodiment of a test image measuring device.
Figure 3:
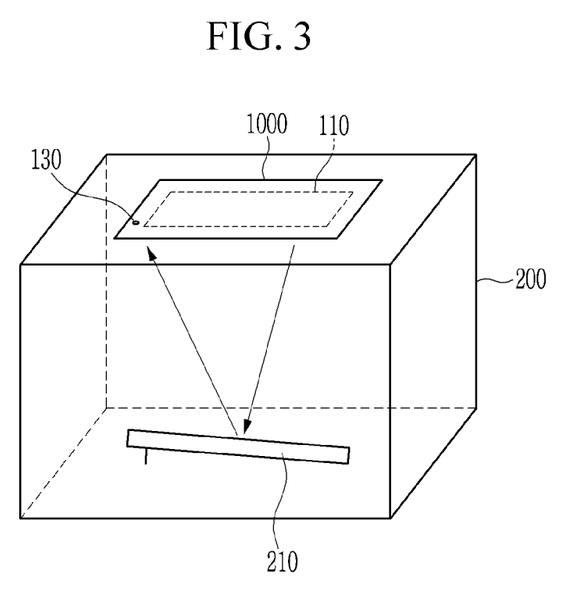
FIG. 3 shows an embodiment of an installation of a display device in a test image measuring device.
Figure 4:
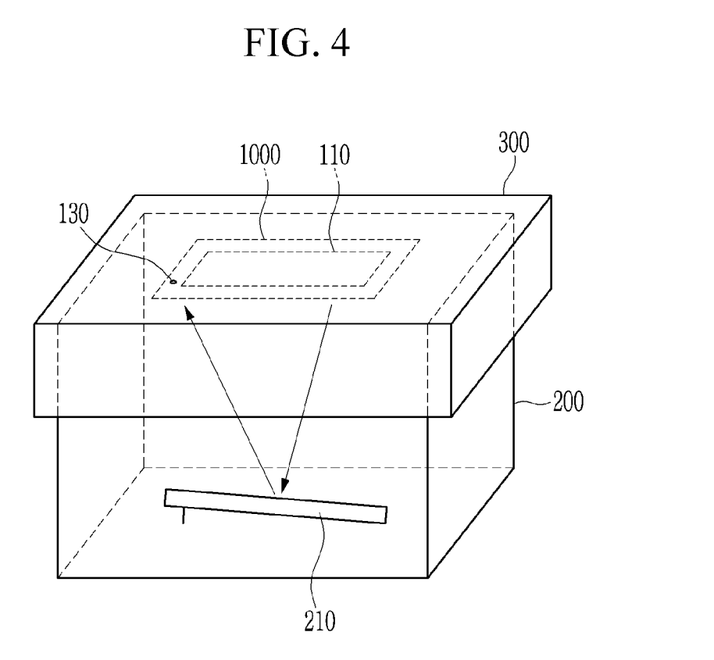
FIG. 4 shows an embodiment of an installation of a cover in a test image measuring device.

FIG. 2 shows a perspective view of an embodiment of a test image measuring device for correcting luminance, FIG. 3 shows an embodiment that a display device is installed in a test image measuring device for correcting luminance, and FIG. 4 shows an embodiment of an installation of a cover in a test image measuring device.

Referring to FIG. 2, the test image measuring device for correcting luminance in an embodiment includes a housing 200 and a reflector 210.

The housing 200 represents a box-shaped space provided in a hexahedral shape, and an opening 20 is defined in one side of the housing 200. In FIG. 2, the opening 20 is defined in an upper side (first side) of the housing 200, but, the invention is not limited thereto, and may be defined in a lateral side of the housing 200 in other embodiments.

Referring to FIG. 2, a display device is disposed in the opening 20, and the display unit 110 and the imaging unit 130 of the display device are disposed to face a lower side (second side) of the housing.

In an embodiment, a length L2 of the opening 20 is less than a length L1 of the display device 1000, and a width D2 of the opening 20 is less than a width D1 of the display device 1000.

Accordingly, when a display device that is greater than the length L2 and the width D2 of the opening 20 is disposed in the opening 20 of the housing 200, an internal space of the housing 200 is in a dark room state. In an embodiment, the internal space of the housing 200 may be coated to be black so as to maintain the dark room state, for example.

The reflector 210 represents a mirror provided inside the housing 200 and including a reflection side. The reflector 210 is provided on a lower side (second side) of the housing 200 such that the reflector 210 faces the housing 200, and is installed to be inclined by a predetermined angle from the lower side. The predetermined angle signifies an angle within a predetermined range in which a test image displayed by the display unit 110 may be reflected to the reflector 210 and the entire display area of the display unit 110 may be photographed by the imaging unit 130. In this instance, a maximum angle represents an angle by which a part of a bezel surrounding the screen of the display unit 110 may be included. In an embodiment, when the opening 20 is defined in a side of the housing 200, the reflector 210 may be provided on a side facing the opening 20. Further, when a minimum angle of the reflector 210 is acquired in an embodiment, a distance between the first side in which the opening 20 is defined and the second side on which the reflector 210 is installed may be less than that shown in FIG. 3.

The test image displayed by the display unit 110 is reflected to the reflector 210, and the imaging unit 130 photographs a test reflecting image reflected to the reflector 210. Therefore, in an embodiment, a test image may be displayed, the test image may be photographed, and data for correcting luminance may be obtained while using the product by the display device 1000 including the display unit 110 and the imaging unit 130.

The test image measuring device in an embodiment further includes a cover 300.

Referring to FIG. 4, the cover 300 for covering the housing 200 and the display device 1000 is provided outside the housing 200. The cover 300 covers an upper side and a lateral side of the housing 200. Although not shown in FIG. 4, a lateral side of the cover 300 may be fixed to the lateral side of the housing 200 by a fixing device. In an embodiment, the cover 300 may be fixed to the housing 200 by a fixing device that may be opened or closed such as a zipper or Velcro so that one side of the cover 300 may be opened or closed. The display device 1000 may be installed over the opening 20 by one side of the cover 300 that may be opened or closed.

The cover 300 functions as a blocking film so that no light may be input to the inside of the housing 200. Accordingly, the housing 200 may maintain the darkroom state. As the internal space of the housing 200 completely maintains the darkroom state, the test image by the display unit 110 is photographed by the imaging unit 130 without noise.

A luminance correcting method using a test image measuring device for correcting luminance will now be described.

Figure 5:
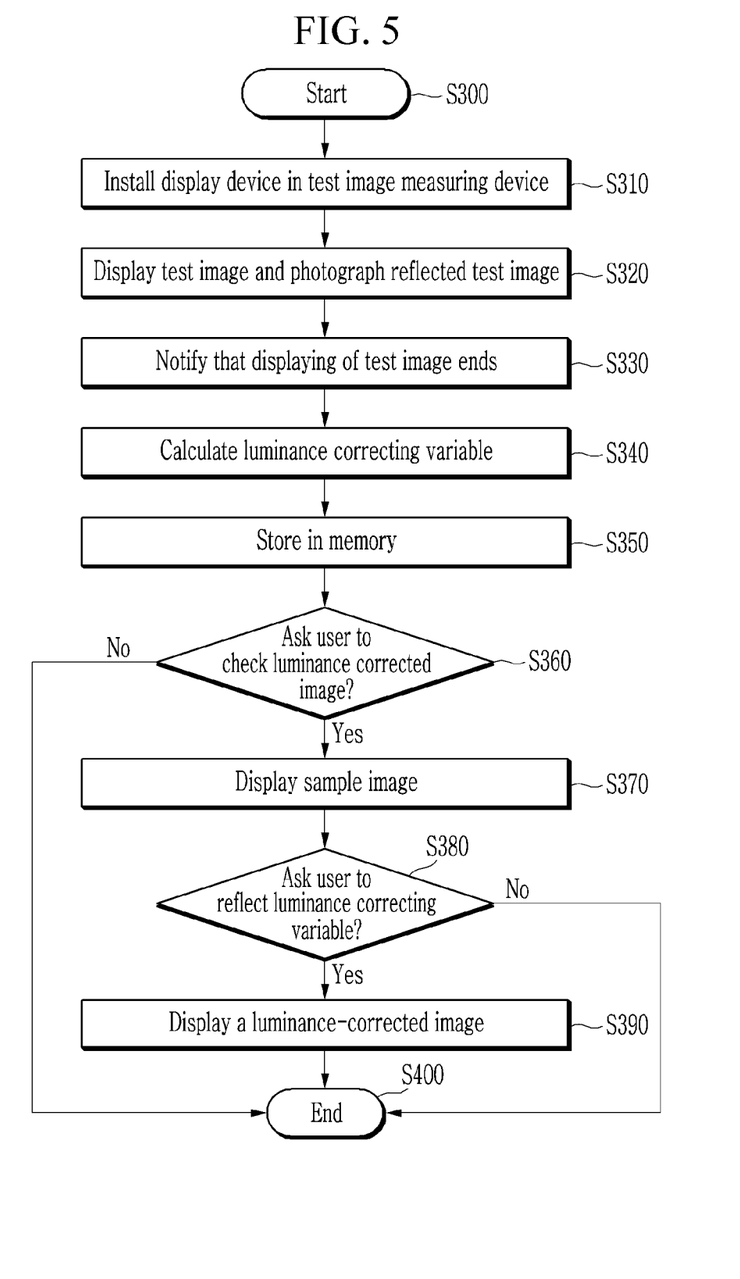
FIG. 5 shows an embodiment of a flowchart of a luminance correcting method.
Figure 6:
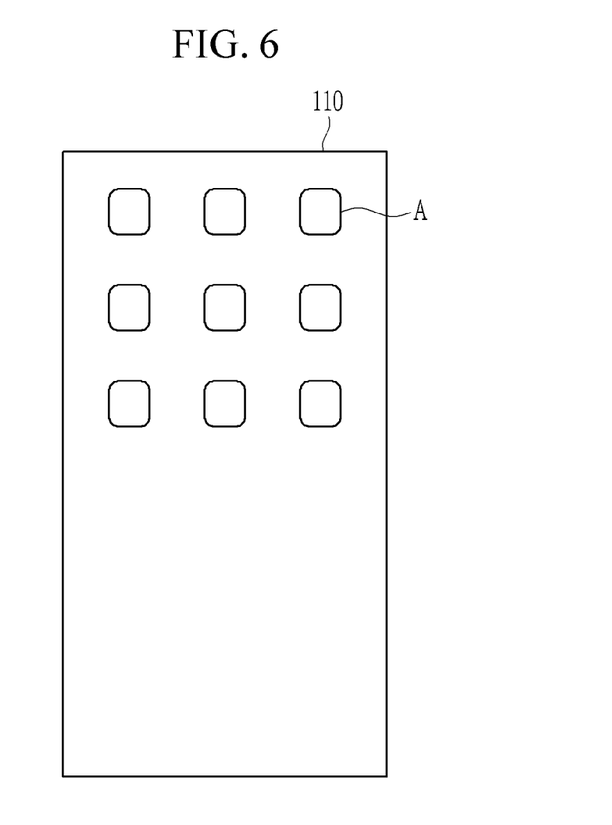
FIGS. 6, 7, and 8 show an embodiment of a display unit for a luminance correcting method.
Figure 7:
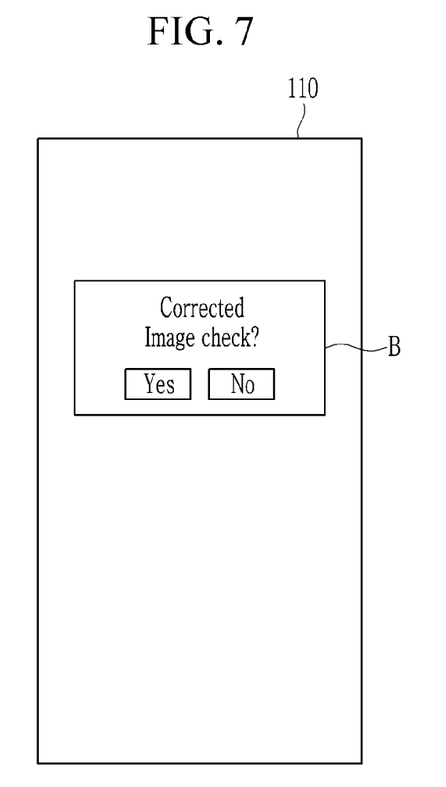
Figure 8:
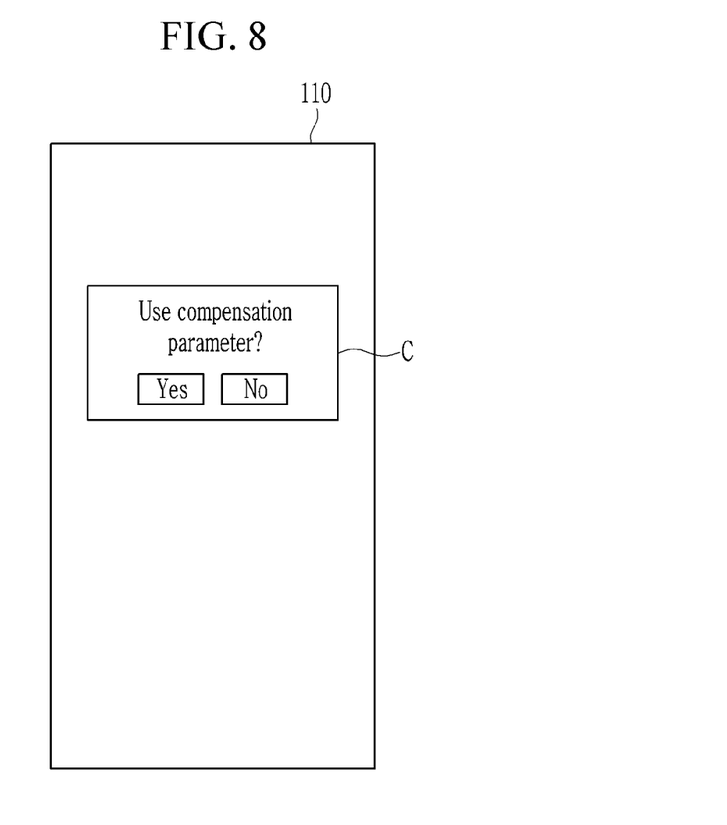

FIG. 5 shows a flowchart of an embodiment of a luminance correcting method, and FIGS. 6 to 8 exemplary show an embodiment of a display unit for a luminance correcting method. The luminance correcting method and a test measuring device for correcting luminance will now be described with reference to the display device described with reference to FIGS. 1 to 4.

Referring to FIG. 5, the luminance correcting method in an embodiment starts when the user inputs a start signal to the display unit 110 of the display device 1000 (S300).

FIG. 6 shows a screen on which a plurality of applications (icons) are displayed to the display unit 110 realized with a touch screen. In an embodiment, when the user touches a luminance correction icon (A) from among a plurality of applications displayed to the display unit 110, the luminance correcting method in an embodiment starts, for example. In an embodiment, when an input section of the luminance correcting device is realized to a physical key or button provided to the outside of the display device, the user may press the physical key disposed on the lateral side of the display device to start the luminance correcting method.

As shown in FIG. 3, the user installs the display device 1000 on the test image measuring device for correcting luminance (S310). The user installs the display device 1000 above the opening 20 of the test image measuring device so that the imaging unit 130 and the display unit 110 of the display device 1000 may face the reflector 210.

When a predetermined time passes after the user's start signal, a test image is displayed to the display unit 110, and the imaging unit 130 photographs the test reflecting image reflected from the reflector 210 (S320). The predetermined time represents a time that is needed for the user to install the display device on the test image measuring device, and may be a predetermined time in the luminance correcting device, or may be a time determined by a timer that is operated when the user inputs a necessary time.

When the display unit 110 displays all the test images, the alarm 160 provides a notification such as a vibration or an alarm sound to the display device 1000 to notify that displaying of the test image of the display unit 110 is finished (S330).

Based on the test reflecting image data photographed by the imaging unit 130, luminance correcting variables of the each pixel are calculated by comparing gray values of the reflected test image data and a reference gray value of the display device (S340).

The calculated luminance correcting variables are stored in the memory (S350).

The display unit 110 displays a notification window for asking the user to check a sample image to which a luminance correcting variable is applied (S360).

In an embodiment, referring to FIG. 7, the display unit 110 waits for the user's signal by displaying a notification window B such as a "Corrected Image Check". When the user inputs 'YES', the next stage is performed, and when the user inputs 'NO', the luminance correcting device stops (S400). FIG. 7 shows an embodiment, and a message for the user to check the luminance-corrected image may be expressed in various ways depending on embodiments.

In the next stage, the display unit 110 displays a luminance-corrected sample image (S370), and displays a notification window for asking the user whether or not to apply the luminance correcting variable to the display device 1000 (S380).

In an embodiment, referring to FIG. 8, the display unit 110 waits for the user's signal by displaying a notification window C such as a "Use compensation parameter?". When the user inputs 'YES', the next stage is performed, and when the user inputs 'NO', the luminance correcting device stops (S400).

In the next stage, the display unit 110 displays the image of which luminance is generally corrected (S390). That is, the display device 1000 may generate a data voltage provided to the display unit 110 based on a corrected gamma voltage, and may display a luminance-corrected image of which is uniformly corrected.

The luminance correcting method in an embodiment may solve the drawbacks of the display device such as image sticking or mura by the test image display device for correcting luminance, after the product is shipped.

Further, as the user solves the image-quality distortion phenomenon of the display device, the lifespan of the display device may be increased.

Algorithm elements described in the specification are (totally or partly) realized as software or hardware (e.g., a part of an application specific integrated circuit ("IC")) operable on a specific digital signal processor or a general-purpose processor.

Figure 9:
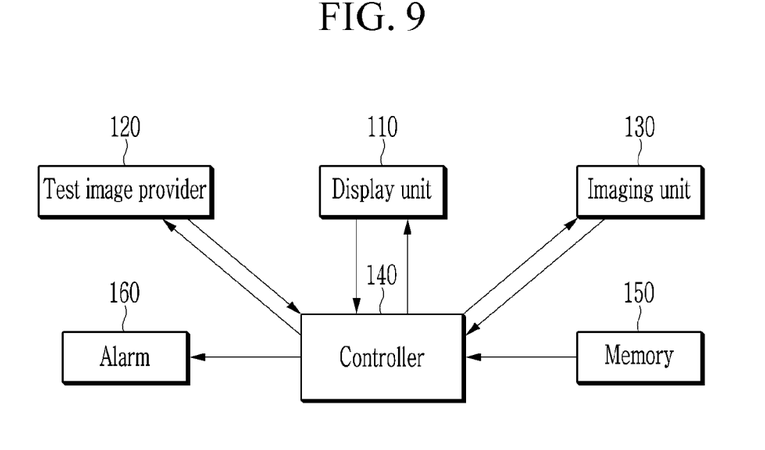
FIG. 9 shows an embodiment of a block diagram of a luminance correcting device.
Figure 10:
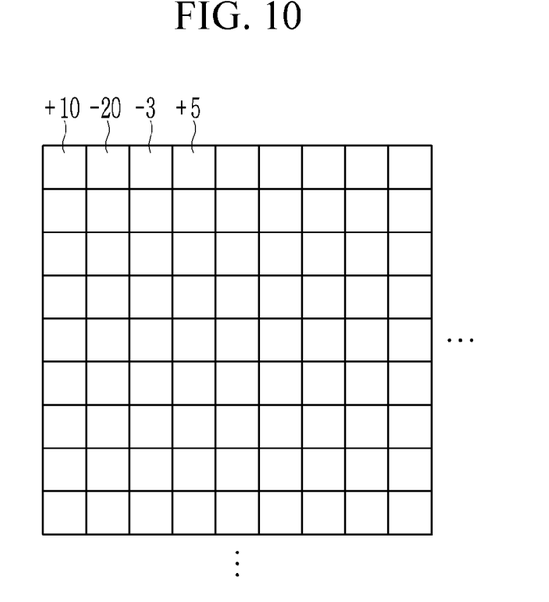
FIG. 10 shows an embodiment of correction values calculated by a luminance correcting device.

FIG. 9 shows an embodiment of a block diagram of a luminance correcting device, and FIG. 10 shows an embodiment of correction values calculated by a luminance correcting device.

Referring to FIG. 9, the luminance correcting device in an embodiment includes a display unit 110, a test image provider 120, an imaging unit 130, a controller 140, a memory 150, and an alarm 160. The luminance correcting device in an embodiment may be provided inside a microprocessor ("MPU"), and may be realized as a microcontroller ("MCU").

The display unit 110 represents a portion where the image is displayed in the display device 1000 shown in FIG. 1. The display unit 110 receives input data from the controller 140 to display an image, and includes a plurality of pixels. Here, the image may be a test image according to respective single-color grays of red (R), green (G), and blue (B), for example, according to the input data, and may be a general image excluding the single-color image.

A plurality of pixels may be a unit pixel configured with sub-pixels of red (R), green (G), and blue (B), or may be a unit pixel configured with sub-pixels of red (R), green (G), blue (B), and white (W). Three-color input data (RGB) or four-color input data (RGBW) may be supplied to the respective pixels. Here, from among the four-color input data (RGBW), the white (W) input data are set with minimum gray values of the initial red (R), green (G), and blue (B) data, and the respective red (R), green (G), and blue (B) input data have a gray value that is generated by subtracting the white (W) input data from the gray values of the initial red (R), green (G), and blue (B) data.

The test image provider 120 receives a test image control signal from the controller 140, and provides a test image to the display unit 110. Further, the test image provider 120 may receive a test image control signal from the controller 140, and may provide a test image to the display unit 110 through the controller 140.

The test image provider 120 sequentially provides one-frame input data corresponding to first to n-th test images with different reference gray values to the display unit 110. In an embodiment, the test image provider 120 generates a first test image with a reference gray value of 63, a second test image with a reference gray value of 127, a third test image with a reference gray value of 191, and a fourth test image with a reference gray value of 255, and sequentially provides the first to fourth test images to the display unit 110, for example. Accordingly, the display unit 110 sequentially displays the first to fourth test images according to the one-frame input data supplied by the test image provider 120.

The imaging unit 130 is a front-side camera of the display device 1000 shown in FIG. 1. The imaging unit 130 receives a photographing control signal from the controller 140, and photographs the test image displayed by the display unit 110 and reflected by the reflector 210. That is, the imaging unit 130 photographs first to n-th test reflecting images reflected by the reflector 210 from among the first to n-th test images sequentially displayed to the display unit 110, and provides the photographed first to n-th test reflecting image data to the controller 140. Here, n is a natural number greater than one.

The controller 140 performs a general control operation of the luminance correcting device. The controller 140 controls the above-described display unit 110, the test image provider 120, the imaging unit 130, and the alarm 160.

The controller 140 applies input data to control the display unit 110 so that test images and general images may be displayed to the display unit 110, and the test image provider 120 applies a test image control signal to control the test image provider 120 so that the test images may be displayed to the display unit 110.

The controller 140 applies a photographing control signal to the imaging unit 130 to control the imaging unit 130, and receives the reflected test image data photographed and transmitted from the imaging unit 130.

The controller 140 calculates luminance correcting variables of the each pixel by comparing gray values of the first to n-th test reflecting image data transmitted by the imaging unit 130 and a reference gray value of the display device. In an embodiment, when a gray value of the first pixel of the first reflected test image data is less than the reference gray value, a positive (+) correction value is calculated, and when a gray value of the second pixel of the first test image data is greater than the reference gray value, a negative (−) correction value is calculated, for example. FIG. 10 shows an embodiment of calculating a correction value for each unit pixel of the display unit 110. In an embodiment, a positive correction value of +10 may be calculated for a first pixel in a first row, a negative correction value of −20 may be calculated for a second pixel in the first row, a negative correction value of −3 may be calculated for a third pixel in the first row, and a positive correction value of +5 may be calculated for a fourth pixel in the first row.

The controller 140 calculates sample image data from the correction value, and transmits the same to the display unit 110. Here, the sample image data represent data on the luminance-corrected single-color image generated by reflecting single-color gray values of red (R), green (G), and blue (B) according to the luminance correcting variable from the gray values of the respective single-color data of red (R), green (G), and blue (B) of the existing display device.

Further, the controller 140 generates correction data of the each pixel from the correction value. The controller 140 may generate correction data of each sub-pixel by an addition operation or a subtraction operation of input data of each sub-pixel provided to the current display unit 110, and corrected values of the each sub-pixel. The corrected data are provided to the display unit 110, so the display unit 110 may display the luminance-corrected image.

The memory 150 includes a lookup table storing reference gray values of the each pixel, and provides predetermined reference gray values to the controller 140 so as to prevent distortion of image quality caused by luminance non-uniformity of the each pixel.

The controller 140 receives an ending signal from the test image provider 120 when the display unit 110 finishes displaying of the test image. The alarm 160 receives the ending signal from the controller 140, and provides an alarm signal in a vibration or voice form.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A luminance correcting method after a display device has shipped and in the hands of a user, the method comprising:

receiving a start signal displayed to the user of the display device;

positioning the display device including a display unit and an imaging unit on a test image measuring device;

displaying a test image at the display unit by supplying an identical data voltage to each pixel, and photographing a reflected test image at the imaging unit of the display device;

receiving data of the reflected test image from the imaging unit, and calculating luminance correcting variables of each pixel;

displaying a luminance-corrected image at the display unit by reflecting the calculated luminance correcting variables of each pixel;

displaying a notification window at the display unit which provides the user an option to apply the calculated luminance correcting variables of each pixel to the display device; and displaying a notification window at the display unit which asks the user whether or not to apply the calculated luminance correcting variables of each pixel to the display device preventing deterioration of the display and furthering the lifespan of the display device.

2. The luminance correcting method of claim 1, wherein the displaying the test image at the display unit includes:

starting to display the test image when the start signal is received and a predetermined time passes.

3. The luminance correcting method of claim 2, wherein the predetermined time represents a time for positioning the display device on the test image measuring device.

4. The luminance correcting method of claim 1, further comprising, after the photographing the reflected test image at the imaging unit, notifying that the displaying the test image is finished.

5. The luminance correcting method of claim 1, further comprising, after the luminance correcting variable is calculated, displaying a sample image checking notification window to which the luminance correcting variable is reflected.

6. The luminance correcting method of claim 5, further comprising, after the displaying the sample image checking notification window,
displaying a luminance-corrected sample image when a sample image checking signal is input.

7. The luminance correcting method of claim 6, further comprising,
after the displaying the sample image,
displaying a luminance correcting variable reflection checking notification window,
wherein the luminance correcting variable reflection checking notification window asks a user whether or not to apply the calculated luminance correcting variables to the display unit of the display device.

8. The luminance correcting method of claim 7, wherein
after the luminance correcting variable reflection checking notification window is displayed,
the display unit displays a luminance-corrected image when the luminance correcting variable reflecting signal is input.

9. The luminance correcting method of claim 1, wherein the test image measuring device includes:
a housing including a side in which an opening is defined; and
a reflector provided to be inclined by a predetermined angle from another side of the housing facing the opening, and
the display device is provided above the opening, while
a test image displayed from the display unit is photographed by the imaging unit through the reflector,
wherein the test image measuring device has only one reflector.

* * * * *